Patented Sept. 20, 1949

2,482,285

UNITED STATES PATENT OFFICE 2,482,285

DIOLEFIN-STYRENE-ALKENYLETHYNYL-CARBINOL TRIPOLYMERS

Charles J. Mighton, Wilmington, Del., assignor to E. I. du Pont de Nemours & Company, Wilmington, Del., a corporation of Delaware No Drawing. Application May 17, 1944, Serial No. 536,027

8 Claims. (Cl. 260—80.7)

1

This invention relates to synthetic rubber-like materials and, more particularly, to such materials obtained by polymerizing mixtures of a 1,3-diene hydrocarbon, styrene, and (1-alkenylethynyl) carbinols. In the nomenclature as used in this case, the numeral "1" in the parentheses refers to the position of the double bond in the alkenyl group.

This application is a continuation-in-part of my copending application Serial No. 447,855, filed June 30, 1942, now abandoned.

One of the most useful rubber-like materials obtained from 1,3-diene hydrocarbons is that obtained by polymerizing mixtures of 1,3-butadiene with styrene. This product is of great technical importance because of the readiness with which the 1,3-butadiene and styrene may be secured, and also because of the great number of applications, such as the manufacture of tires, for which it is suitable. Difficulty has been experienced, however, in processing this product in the equipment developed for the processing of natural rubber. Methods have been suggested for improvement of the product in this respect. Thus, in U. S. Patent No. 2,234,204 the improvements of plasticity are obtained by having a small amount of sulfur present during the polymerization of the 1,3-butadiene and styrene, and subsequently treating this polymer with various compounds, such as the thiuram disulfides. Other methods suggested are polymerizing in the presence of various sulfur compounds as in U. S. Patent No. 2,248,107, particularly certain aliphatic mercaptans as in U. S. Patent No. 2,281,613, or in the presence of a diazo amino aryl compound, as in U. S. Patent No. 2,313,233. Still another method is to subject the finished polymer to atmospheric oxidation under carefully controlled conditions as in British Patent No. 513,116. None of these procedures, however, gives the degree of improvement desired, and, moreover, some decrease the textile strength of the product obtained from the plasticized materials by vulcanization. The tensile strength, indeed, of the vulcanizates of even the unplasticized material is, in general, inferior to that of natural rubber and, hence, improvement in this respect also is desirable. Moreover, improvement is desirable in the speed and facility of the production of these synthetic products.

It is therefore an object of the present invention to produce rubber-like products with improved processing characteristics. Another object is to provide rubber-like products with improved tensile properties. Another object is to improve the production of these products from

2 the manufacturing standpoint. Other objects will appear hereinafter.

These objects have been accomplished by making a material resembling raw natural rubber by polymerizing a mixture of a 1,3-diene hydrocarbon, styrene, and a (1-alkenylethynyl) carbinol wherein at least 50% of the polymerizable material is 1,3-diene hydrocarbon, at least 50% of the remainder is styrene, and at least 1% of the polymerizable material is a (1-alkenylethynyl) carbinol in which the alkenyl radical contains from 2 to 6 carbon atoms.

In order that the process may be more fully understood, the following specific examples are given by way of illustration, but the invention is not limited thereto as will become more apparent hereinafter.

Example 1

A mixture of 75 parts of 1,3-butadiene, 20 parts of styrene, and 5 parts of dimethyl(ethenylethynyl) carbinol, $CH_2=CH-C\equiv C-C(CH_3)_2OH$, containing 0.75 part of a mixture of straight-chain primary mercaptans containing an average of 13 carbon atoms was emulsified by agitation in an autoclave with an emulsifying solution made from 150 parts of water, 4 parts of oleic acid and 1.075 parts of sodium hydroxide and also containing 1 part of potassium persulfate, 0.05 part of potassium ferricyanide, and 1 part of the sodium salts of the dinaphthyl methane sulfonic acids prepared from naphthalene, formaldehyde, and sulfuric acid according to U. S. Patent No. 1,336,579. The emulsion was then polymerized at 40° C. for 19 hours. The resulting latex was then treated with 3 parts of a 50% aqueous dispersion of a 55:45 eutectic mixture of phenyl alpha-naphthylamine and diphenylamine and then acidified and coagulated by the addition of sodium chloride solution and acetic acid. The coagulum was then washed with warm water on a rubber mill with corrugated rolls and then dried on a warm rubber mill with smooth rolls. Ninety-one (91) parts of a plastic, rubber-like product were obtained. Alternatively, the dry product may be obtained from aqueous dispersion by the process disclosed in the U. S. application for patent of Wanderer, Serial No. 362,557, filed October 24, 1940, now U. S. Patent 2,371,722, according to which the latex-like dispersion and the coagulating agent are introduced into a hopper from which the resulting coagulum is delivered into the larger end of a truncated cone, is then forced by a rotating worm to the smaller end of the cone and out through a perforated plate. The resulting threads or ribbons are washed with water, then dried by extrusion twice more through apparatus similar to that described above for the treatment of the fresh coagulum, but without the addition of any coagulating agent. The final drying is carried out by contacting the extruded threads with a current of warm air. The dried polymer was compounded for testing with 50 parts of reinforcing carbon black, 2 parts of stearic acid, 2 parts of sulfur, 5 parts of zinc oxide, and 1.25 part of 2-mercaptothiazoline for each 100 parts of polymer, and was vulcanized for 30 minutes at 40 pounds steam pressure (141° C.). When thus compounded and vulcanized, the product which had been dried by milling gave a tensile strength of 3720 pounds per square inch with an elongation of 575% at break, while that processed by extrusion gave a tensile strength of 4090 pounds per square inch with an elongation of 560%.

The product of this example had at least four important advantages over a product prepared under substantially the same conditions from 75 parts of 1,3-butadiene and 25 parts of styrene and no carbinol. Thus, the product of Example 1 made with the (ethenylethynyl) carbinol was much more cohesive and tacky and, thus, could be much more readily mixed with compounding ingredients and processed with ordinary rubber-working machinery. The product made from 1,3-butadiene and styrene only was by comparison dry and non-cohesive and was much less readily compounded. Thus, the thin sheet of rubber-like material formed by passage through the mill sometimes did not stay in contact with the rolls, and did not readily form a bank or roll in which the material was mixed before passing again between the rolls. On the other hand, the product of Example 1 did not show these disadvantages, and, in fact, behaved much like natural rubber. Furthermore, the strength of the vulcanizate of the product obtained in the example was also considerably greater than for the corresponding material made from 1,3-butadiene and styrene only, which gave a tensile strength of only 2885 pounds with an elongation of 525%. In addition, vulcanizates of the product obtained in this example built up less heat on flexing. For example, a pellet ¾ inch in diameter and one inch in length cured for 30 minutes at 141° C. and flexed in a Goodrich Flexometer until the temperature of the pellet remained constant, showed a temperature rise of only 57° C. The corresponding material made from 1,3-butadiene and styrene only, in the same test showed a temperature increase of 78° C. Furthermore, the process of the present example results in scarcely any coagulation of the latex during polymerization, whereas, in the comparative experiment with 1,3-butadiene and styrene only, a considerable amount of polymer is usually found in the apparatus at the end of the polymerization step, thus making frequent cleaning of the apparatus necessary. These differences are the more surprising because they result from the use of only 5% of the carbinol.

*Example 2*

A mixture of 75 parts of 1,3-butadiene, 15 parts of styrene, and 10 parts of dimethyl-(ethenylethynyl) carbinol containing 0.5 part of the mixture of mercaptan used in Example 1, was emulsified in a solution made by dissolving 4 parts of oleic acid and 1.075 part of sodium hydroxide in 150 parts of water which also contained 1 part of potassium persulfate and 1 part of the sodium dinaphthyl methane sulfonate used in Example 1, and was then heated for 35 hours at 40° C. The apparatus in which the emulsification and polymerization were carried out consisted of sealed glass tubes which were continuously rotated end over end in a bath maintained at the proper temperature. The latex-like product resulting was treated with 4 parts of the dispersion of antioxidants used in Example 1, and then was coagulated with salt and acetic acid and finally washed and dried by milling as already described. Ninety-six (96) parts of a soft, plastic, rubber-like product was obtained. This was compounded with 2 parts of phenyl alpha-naphthylamine, 50 parts of reinforcing carbon black, 2 parts of stearic acid, 2 parts of sulfur, 1 part of mercapto benzothiazole and 5 parts of zinc oxide per 100 parts of rubber-like product. When vulcanized for 30 minutes at 141° C., the tensile strength was 3555 pounds per square inch with an elongation of 450% at break.

In a similar run in which 75 parts of 1,3-butadiene and 25 parts of styrene without any (ethenylethynyl) carbinol were polymerized under identical conditions, the yield was only 90 parts in 35 hours at 40° C.; the product was dry and processed with difficulty as already described for the 1,3-butadiene-styrene product used for comparison with the product of Example 1. The tensile strength was only 2800 pounds with an elongation at break of 380%, using the same formula which gave 3555 pounds for the tensile strength of the product of Example 2.

*Example 3*

A mixture of 70 parts of 1,3-butadiene, 15 parts of styrene, and 15 parts of methyl ethyl(ethenylethynyl) carbinol,

and 1 part of the mixed mercaptans used in Example 1, was polymerized using the same quantities of water, oleic acid, sodium hydroxide, sodium dinaphthylmethane sulfonate, and potassium persulfate as used in Example 2, together with 0.05 part of potassium ferricyanide. In 20 hours at 40° C., the yield of product was 93 parts. The product was similar to that obtained in Example 2.

*Example 4*

A mixture of 75 parts of 1,3-butadiene, 20 parts of styrene, and 5 parts of 1-(ethenylethynyl)-cyclohexanol,

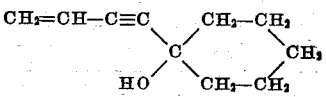

made from cyclohexanone and monovinyl acetylene, was polymerized as in Example 3. The product amounted to 94 parts and was similar to that obtained in the previous examples, particularly Example 1.

*Example 5*

A mixture of 75 parts of 1,3-butadiene, 20 parts of styrene, and 5 parts of dimethyl(isopropenylethynyl) carbinol,

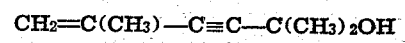

made from isopropenylacetylene and acetone, containing 0.5 part of the mixture of mercaptans used in Example 1, was emulsified in a solution prepared by dissolving 4 parts of oleic acid, 1.13 part of sodium hydroxide, 1 part of potassium persulfate and 1 part of the sodium dinaphthyl methane sulfonate used in Example 1 in 150 parts of water which also contained 0.1 part of potassium ferricyanide. The emulsion was heated 18 hours at 40° C. To the latex-like product formed was added 4 parts of the dispersion of antioxidants used in Example 1, followed by salt and acetic acid to coagulate the product. The resulting coagulated polymer was washed and dried by milling as already described, and amounted to 87 parts. This was compounded with 50 parts of reinforcing carbon black, 2 parts of stearic acid, 2 parts of sulfur, 5 parts of zinc oxide, and 1.25 parts of 2-mercaptothiazoline per 100 parts of the rubber-like product. When vulcanized for 30 minutes at 153° C., the tensile strength was 3580 pounds per square inch with an elongation of 440% at break.

The product of Example 5 was much more cohesive and tacky than a product similarly prepared from 75 parts of 1,3-butadiene and 25 parts of styrene and, thus, could be processed on ordinary rubber-working machinery much more easily. Also, the product from 75 parts of 1,3-butadiene and 25 parts of styrene, compounded and vulcanized in the same way as described for the product of this example, had a tensile strength of only 3070 pounds per square inch and an elongation of 450% at break. Also, the product of this example compounded as described, showed low heat build-up as an increase in temperature of only 46° C. occurred when vulcanized in the form of a pellet ¾ inch in diameter and one inch in length for 120 minutes at 134° C. and flexed for 20 minutes in a Goodrich Flexometer. In this same test, the product prepared from 75 parts of 1,3-butadiene and 25 parts of styrene under similar conditions increased in temperature by 62° C.

*Example 6*

A mixture of 75 parts of 1,3-butadiene, 20 parts of styrene, and 5 parts of dimethyl(isopropenylethynyl) carbinol containing 1 part of pinene mercaptan was polymerized, using the same quantities of water, oleic acid, sodium hydroxide, sodium dinaphthylmethane sulfonate and potassium persulfate as used in Example 5, together with 0.1 part of potassium ferricyanide. In 16 hours at 40° C. the yield of the product was 91 parts, which had been washed and dried in the same manner as the product of Example 5, and found similar to it in cohesiveness, tack, and behavior in rubber-processing equipment. After compounding in the same way as given in Example 5 and vulcanizing for 20 minutes at 141° C., this product had a tensile strength of 4200 pounds per square inch with an elongation of 440% at break. Heat build-up, determined as described in Example 5, was only 46° C. for pellets vulcanized for 50, 80 or 120 minutes at 134° C.

Although the present invention is described above in terms of 1,3-butadiene itself, it is also applicable to any of the class of 1,3-butadienes, such as isoprene and 2,3-dimethyl-1,3-butadiene.

As illustrated in part by the above examples, any (1-alkenylethynyl) carbinol in which the alkenyl radical has from 2 to 6 carbon atoms, can be used. These carbinols can be primary alcohols of which (ethenylethynyl) carbinol, $CH_2=CH-C\equiv C-CH_2OH$, is an example, or they can be secondary or tertiary alcohols and the radicals attached to the carbinol carbon atom can be either aliphatic, aromatic, hydroaromatic or heterocyclic. These radicals can be mono- valent or polyvalent, as illustrated by the 1-(ethenylethynyl) cyclohexanol of Example 5, in which two of the valences of the carbinol are united to a pentamethylene radical. Examples of other suitable (1-alkenylethynyl) carbinols are monomethyl(ethenylethynyl) carbinol, mono-n-propyl(ethenylethynyl) carbinol, diethyl(ethenylethynyl) carbinol, methyl-octyl(ethenylethynyl) carbinol, tetra-methylene(ethenylethynyl) carbinol, methylphenyl(ethenylethynyl) carbinol, furyl(ethenylethynyl) carbinol, (isopropenylethynyl) carbinol, mono-methyl(isopropenylethynyl) carbinol, diethyl(isopropenylethynyl) carbinol and methylethyl(isopropenylethynyl) carbinol. Dialkyl(ethenylethynyl) carbinols and dialkyl(isopropenylethynyl) carbinols are preferred. The preparation and properties of the dialkyl(ethenylethynyl) carbinols are described in U. S. Patents 1,963,934 and 1,963,935. The method of preparation of the dialkyl(isopropenylethynyl) carbinols is the same as for the dialkyl(ethenylethynyl) carbinols, except that isopropenylacetylene is reacted with a ketone instead of ethenylacetylene (monovinylacetylene). Other dialkyl-(1-alkenylethynyl) carbinols having alkyl substituents on the ethenyl radical can also be prepared from the corresponding substituted acetylene and a ketone such as acetone, for example, dimethyl [(4-methyl-1-penten-2-yl)ethynyl]carbinol or dimethyl [(1,3-dimethyl-1-butenyl)ethynyl]carbinol. All of these carbinols can be employed in the interpolymerization reaction with butadiene and styrene to give rubbery interpolymers of improved heat-build-up properties on flexing.

As discussed above, the 1,3-dienes should form at least one-half of the total polymerizable material, while the amount of the (1-alkenylethynyl) carbinol subjected to polymerization should preferably not exceed the amount of the third component, represented by styrene in the examples. A still more preferred composition contains not less than 60% of butadiene and from 1% to 20% of carbinol.

The three component polymeric products containing a (1-alkenylethynyl) carbinol, in particular a dialkyl (ethenylethynyl) carbinol or a dialkyl(isopropenylethynyl) carbinol, when compounded and vulcanized show much less heat build-up or less temperature increase on flexing than the polymers obtained from 1,3-butadiene and styrene alone. This is a great advantage in many applications, for example, in tires, shock absorbers, gaskets, etc., where the rubbery material used is constantly flexed, and failure often results because of the excessive temperatures developed.

The polymerization is preferably carried out in the presence of a mercaptan which contributes to the plasticity of the product. The polymerization is also preferably carried out in the presence of a catalyst, such as a water-soluble persulfate, and also in the presence of a water-soluble complex cyanide, such as potassium ferricyanide, as disclosed in the copending application of Youker, Serial No. 445,219, filed May 30, 1942, now U. S. Patent 2,417,034. Other known methods can also be used for increasing the plasticity of the product. The dispersion in which the polymerization is carried out can be either acid or alkaline. Any of the various types of emulsifying agents previously used for the dispersion of polymerizable compounds are suitable. A carboxylic emulsifying agent is preferred, however, such as that formed by neutralizing oleic acid or a mixture of oleic acid and rosin with a strong alkali such as sodium hydroxide. It is also preferred that the solution be definitely alkaline, as results from the addition of 0.1% to 1% of sodium hydroxide (based on the weight of polymerizable substances present) in addition to the quantity required for neutralization of the carboxylic acid. About 0.5% excess of sodium hydroxide is particularly preferred. It has been found that this alkalinity accelerates polymerization to a marked degree. It is also preferred that the dispersion be further stabilized by the addition of a naphthalene sulfonic acid sodium salt such as is used in the examples. Four (4) parts of the carboxylic acid for 100 parts of polymerizable material is a suitable proportion, although this may be varied considerably, as already discussed in the prior art.

A suitable temperature for carrying out the polymerization is between 30° C. and 50° C. and preferably about 40° C., although variations outside this range are operable and, in fact, are definitely advantageous under some circumstances. The effect of the variation of the temperature of polymerization is already fairly well known in the art.

Coagulation of the dispersion may be brought about by any of the already well known methods. For the preferred emulsifying system, sodium chloride is preferred, although other salts such as magnesium sulfate and aluminum sulfate are also suitable. The coagulation may also be carried out by adding alcohol or by freezing in thin layers, as described in U. S. Patent No. 2,187,146.

The compounding and vulcanizing of the product is carried out along the lines used for natural rubber and for synthetic rubber derived from butadiene. The use of mercapto thiazoline as in Example 1 as an accelerator of vulcanization is particularly preferred for the product of the present invention.

The presence of the carbinol in the three component polymeric products results in greater plasticity, cohesion, and tackiness than is obtained with the 1,3-diene hydrocarbon and styrene. Moreover, compounding, milling and other processing characteristics are improved. These improvements are accompanied by increased tensile strength in the vulcanized product and lower heat build-up. The products of the invention are especially useful as substitutes for natural rubber in the making of tires, although they may also be used in place of rubber in the many other uses to which natural rubber has been put.

I claim:

1. A rubber-like material obtained by polymerizing in an aqueous emulsion a mixture of polymerizable compounds consisting of 75% of 1,3-butadiene, 20% of styrene, and 5% of dimethyl(ethenylethynyl) carbinol.

2. A rubber-like material obtained by polymerizing in an aqueous emulsion a mixture of polymerizable compounds consisting of from 60% to 75% of a 1,3-diene hydrocarbon, from 5% to 20% of a (1-alkenylethynyl) carbinol in which the alkenyl radical contains from 2 to 6 carbon atoms, the remainder of the polymerizable mixture being styrene.

3. A rubber-like material obtained by polymerizing in an aqueous emulsion a mixture of polymerizable compounds consisting of from 60% to 75% of 1,3-butadiene, from 5% to 20% of (ethenylethynyl) carbinol, the remainder of the polymerizable mixture being styrene.

4. A rubber-like material obtained by polymerizing in an aqueous emulsion a mixture of polymerizable compounds consisting of from 60% to 75% of 1,3-butadiene, from 5% to 20% of dimethyl(ethenylethynyl) carbinol, the remainder of the polymerizable mixture being styrene.

5. An elastic rubber-like material having good tensile strength, obtained by vulcanizing the product of claim 2.

6. An elastic rubber-like material having good tensile strength, obtained by vulcanizing the product of claim 3.

7. An elastic rubber-like material having good tensile strength, obtained by vulcanizing the product of claim 4.

8. An elastic rubber-like material having good tensile strength, obtained by vulcanizing the product of claim 1.

CHARLES J. MIGHTON.

REFERENCES CITED

The following references are of record in the file of this patent:

UNITED STATES PATENTS

| Number | Name | Date |
|---|---|---|
| 2,234,204 | Starkweather | Mar. 11, 1941 |
| 2,313,233 | Fryling | Mar. 9, 1943 |
| 2,417,034 | Youker | Mar. 4, 1947 |
| 2,424,182 | Mighton | July 15, 1947 |